Sept. 1, 1964 W. F. THOMA 3,146,639
INDEXING MECHANISM
Filed Feb. 3, 1961 2 Sheets-Sheet 1

INVENTOR.
Willard F. Thoma.
BY
Harness, Dickey & Pierce.
ATTORNEYS.

Sept. 1, 1964

W. F. THOMA 3,146,639

INDEXING MECHANISM

Filed Feb. 3, 1961

INVENTOR.
Willard F. Thoma.
BY
Harness, Dickey & Pierce
ATTORNEYS

United States Patent Office 3,146,639
Patented Sept. 1, 1964

3,146,639
INDEXING MECHANISM
Willard F. Thoma, 545 Pear Tree, Grosse Pointe, Mich.
Filed Feb. 3, 1961, Ser. No. 86,948
5 Claims. (Cl. 74—820)

This invention relates to indexing mechanisms and more particularly to an indexing device for indexing and accurately positioning objects through successive work stations.

While the features of this invention have been exemplified by a mechanism utilized for indexing and positioning a plurality of workpieces at successive work stations, it should be understood that the concepts presented therein are not restricted to that particular application.

In a device for performing a succession of work operations on different workpieces, the means for automatically indexing and positioning the different workpieces must be capable of repetitively providing accurate and exact locations. In such a device it is also desirable that the positional accuracy be readily and accurately checked. It is desirable that any inaccuracy due to wear, etc., be capable of compensation by the simple replacement of relatively inexpensive parts rather than by elaborate machining, sleeving, and/or replacement of expensive parts. Therefore, it is an object of this invention to provide an indexing mechanism having accurate means for positioning objects through various work stations.

It is an object of this invention to provide an indexing mechanism having means for accurately positioning different objects through successive work stations, which means are easily and accurately checked for positional exactness.

It is an object of this invention to provide an indexing mechanism for accurately positioning different objects through a succession of work stations having positioning means which are relatively easy to correct for positional inaccuracies due to wear, etc.

Other objects, features, and advantages of the present invention will become apparent from the subsequent description and the appended claims, taken in conjunction with the accompanying drawings, in which:

Figures 1, 2:
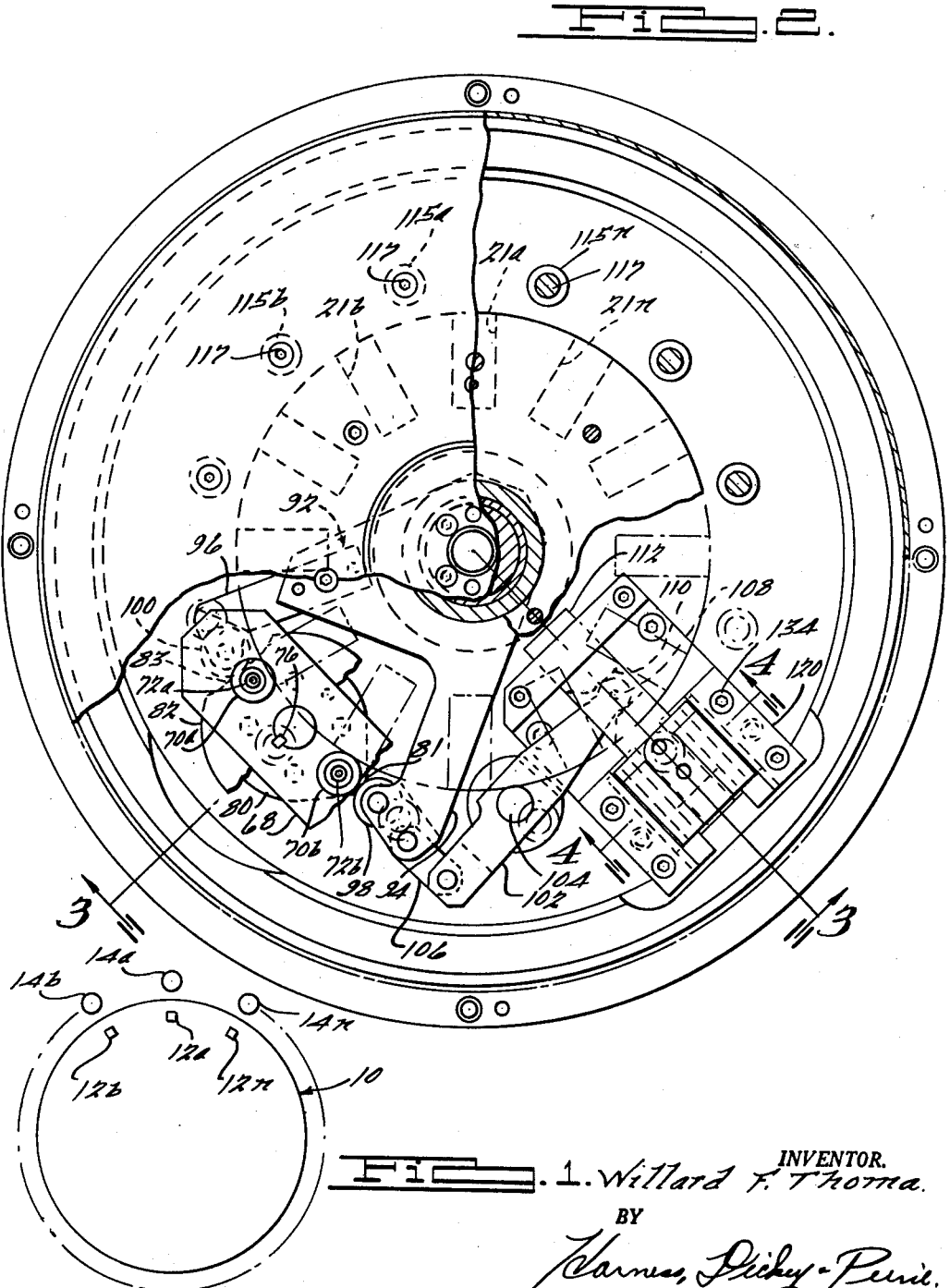
FIGURE 1 is a plan view showing the indexing mechanism of this invention in one environment.
FIGURE 2 is a plan view of an indexing mechanism embodying the features of this invention with some portions partially broken away.

Looking now to FIGURE 1, an indexing mechanism generally indicated by the numeral 10 is shown to have a plurality of workpieces 12a–12n mounted thereon for intermittent rotation through a series of consecutive work stations generally indicated by 14a–14n. Each workpiece is consecutively located at each work station 14a–14n where a different operation is performed on that workpiece. Since the work stations 14a–14n are fixed relative to the indexing mechanism 10 and since the workpieces 12a–12n are fixed relative to the rotating members of the indexing mechanism 10, accurate positioning must be provided in order that all of the workpieces 12a–12n be simultaneously accurately positioned relative to each work station 14a–14n through each succeeding step. In this type of operation, positional inaccuracies of the mechanism 10 in locating the workpieces 12a–12n relative to the individual work stations 14a–14n cannot be compensated by simply adjusting the position of some of the work stations 14a–14n or of the location of some of the workpieces 12a–12n. This is true since all of the workpieces 12a–12n must be properly positioned simultaneously relative to work stations 14a–14n during every indexing position.

In general, the indexing mechanism 10 is comprised of a dial plate assembly 16 (FIGURES 1 and 2) which is secured for rotation about a spindle assembly 18. Both the dial plate assembly 16 and the spindle assembly 18 are supported upon a base assembly 20 which also houses the drive and indexing means 22. Final and accurate positioning and locking of the dial plate assembly 16 in the desired location is performed by a final positioning and locking means 24, which is mounted onto the base assembly 20.

Figure 3:
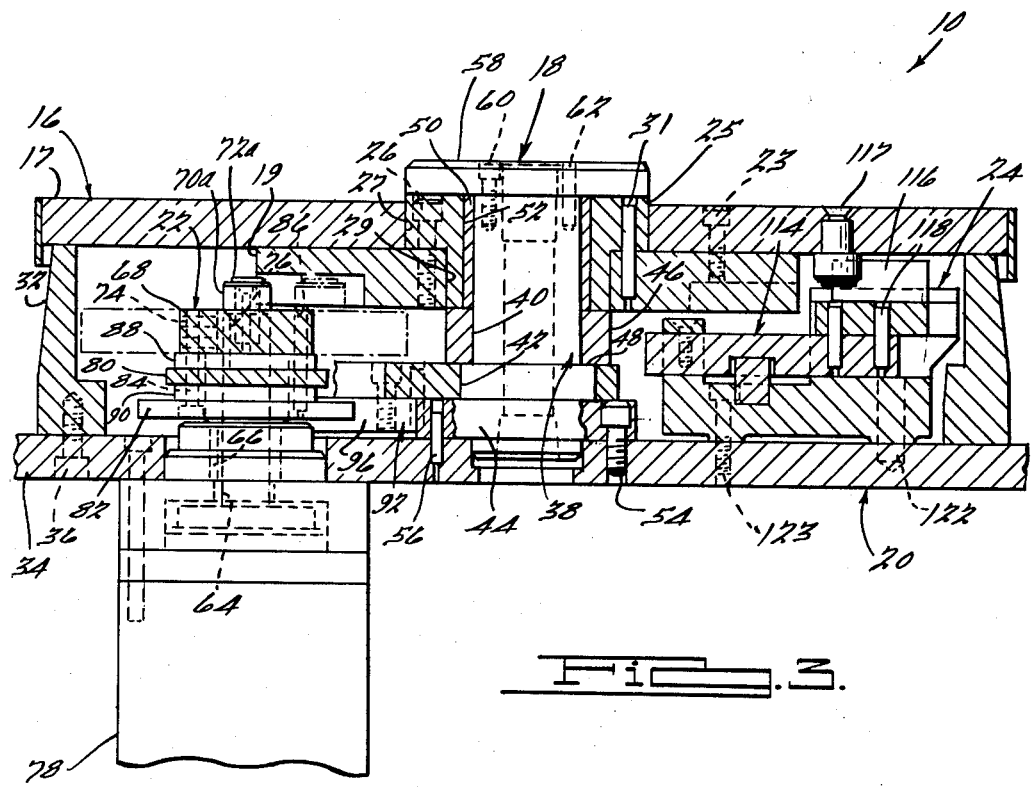
FIGURE 3 is a sectional view taken substantially along the line 3—3 in FIGURE 2.

The dial plate assembly 16 is composed of a dial plate 17 (FIGURES 2 and 3), which is concentric with and secured to a geneva or index plate 19 by a plurality of studs 23. The geneva or index plate 19 has a plurality of radially extending slots or grooves 21a–21n disposed in substantially radial increments about the periphery of the geneva plate 19. The slots 21a–21n are located on the bottom side of the geneva plate 19 and perform a function to be described later. The dial plate 17 has a centrally located bore 27 which is of a larger diameter than a concentrically located bore 29 in the geneva plate 19. A hub 25 has an external surface with a stepped configuration which is matably disposed within the recess defined by the bores 27 and 29 and is secured to the geneva plate 19 by means of a plurality of studs 26 and dowel pins 31.

The dial plate assembly 16 is axially supported by the base assembly 20 by means of an annular support 32 secured to a base member 34 by a plurality of studs 36. The annular support 32 is in peripheral contact with the bottom side of the dial plate 17. The dial plate assembly 16, which is thus axially supported by the annular support 32, is mounted for rotation about the spindle assembly 18 which is secured to the base member 34 in a manner to be described.

The spindle assembly 18 has a post 38 composed of generally circular portions 40, 42 and 44, having progressively larger diameters. A spacer 46 is disposed upon the shoulder 48 formed between the circular portions 40 and 42 and thus provides axial center support for the dial plate assembly 16 by contacting the bottom side of the hub 25. Note that, as described, the dial plate assembly 16 is axially supported at its periphery by the annular support 32 and at its central area by the spacer 46. Depending upon the function to be served, the dial plate assembly could be supported at either location alone. An annular sleeve 50 is disposed between a bore 52 in the hub 25 and the external surface of the circular portion 40 of the post 38. The sleeve 50 provides a bearing surface and facilitates the relative rotation between the dial plate 17 and the post 38. The post 38 is secured to the base member 34 by means of a plurality of studs 54 and dowel pins 56 which are in engagement with the circular portion 44. A cap 58, having a diameter approximately equal to the diameter of the bore 27 in the dial plate 17, is secured to the center post 38 by means of a plurality of studs 60 and dowel pins 62, thus dirt and other extraneous matter are prevented from entering into the bearing area between the dial plate 17, the sleeve 50 and the circular portion 40 of the center post 38. Thus with the assembly thus far described the dial plate assembly is axially supported by the base assembly 20 and is free to rotate about the spindle assembly 18.

While other types of motion could have been used, a true geneva type motion was selected since it does provide for smooth starting and stopping and affords the speeds required for such indexing operations. The geneva motion is imparted to the dial plate assembly 16 by means of the drive and indexing means 22.

The drive and indexing means 22 is composed of a drive spindle 64, which is vertically supported for rotation within a bearing assembly 66. The drive spindle 64 carries an elongated drive plate 68 which in turn carries a pair of rollers 70a and 70b for driving the dial plate assembly 16 in the manner to be described. The rollers 70a and 70b are disposed eccentrically relative to the axis of the drive spindle 64 and are located at either extremity of the longitudinal drive plate 68 and are secured for rotation by means of pins 72a and 72b respectively. The drive plate 68 is fixedly secured to the drive spindle 64 by means of a pair of set screws 74 which are in engagement with an elongated groove 76 on the drive spindle 64. The drive spindle 64 is rotated by means well known in the art and representatively indicated by 78.

The distance between the rollers 70a and 70b is determined by the distance between adjacents slots or grooves 21a–21n. As the drive spindle 64 is rotated thus rotating the drive plate 68, one of the rollers 70a and 70b, engages one of the slots 21a–21n in geneva plate 19. As one of the rollers 70a and 70b engages one of the slots 21a–21n rotation of the dial plate assembly 16 is caused around the spindle assembly 18. In accordance with the true geneva motion, maximum acceleration is provided when one of the rollers 70a and 70b which is then in engagement with one of the slots 21a–21n is driving perpendicularly to a line through the axis of rotation of geneva plate 19 and through the center of the axis of rotation of that one of the rollers 70a and 70b. Near the completion of the drive motion the velocity of rotation of the dial plate assembly 16 is decreased hence facilitating quick stopping once the indexing has occurred. As the drive spindle 64 continues to rotate the other one of the rollers 70a and 70b then comes into engagement with an adjacent one of the slots 21a–21n and the indexing is continued and the dial plate assembly 16 is indexed to the next position. It should be noted that the motion could be made continuous or there could be provided a cessation of the motion after each indexing step in order to allow more time for a work operation to be performed. The latter can be done by the use of sequencing means well known in the art.

With the apparatus as described above, the dial plate assembly 16 is indexed to the various positions and hence the plurality of workpieces 12a–12n are indexed through the plurality of work stations 14a–14n. However, as previously indicated, the exact positioning of all of the workpieces 12a–12n must be simultaneously provided with respect to all of the work stations 14a–14n at each of the index positions. This latter function is performed in an exact manner by the final positioning and locking means 24.

The operation of the final positioning and locking means 24 is tied into the rotation of a drive spindle 64 and is sequenced thereby by means of a pair of cams 80 and 82. The cams 80, 82 are secured to the drive plate 68 by means of a plurality of studs 84 and dowel pins 86, and are positioned axially therefrom and from each other by means of a pair of spacers 88 and 90. Thus, the cams 80 and 82 rotate with the drive spindle 64 and are selectably positioned relative to the rollers 70a and 70b so as to cooperate with the final positioning and locking means 24 in a manner to be described.

The final positioning and locking means 24 is comprised of a lever assembly 92 which is rotatably secured about the circular portion 42 of post 38 and held axially between the shoulder formed by circular portions 42 and 44 and by the spacer 46. The lever assembly 92 is of a bifurcated construction (FIGURE 2) formed by a lever arm 94 and an axially offset lever arm 96. The lever arm 94 has a cam roller 98 rotatably secured at its extremity for contacting the cam 80 while the offset lever arm 96 has a cam roller 100 at its extremity for contacting the cam 82. The cam 80 is formed with a sharp rise 81 at opposite extremities for providing final positioning and locking action in a manner to be described. The cam 82 is provided with depressed portions 83 at either extremity which are coincident with the rise portions 81 of the locking cam for providing an unlocking action in a manner to be described. The lever arm assembly 92 is connected to a crank arm 102 which is pivotally secured to the base member 34 by means of a pin 104. The crank arm 102 is connected at one extremity to the lever arm 94 by means of a connecting link 106 such that motion of the lever arm assembly 92 is transmitted to the crank arm 102 so as to provide periodic oscillation of the arm 102 about the pin 104. The crank arm 102 terminates in a generally rounded portion at its end 108 opposite to the end connected to the connecting link 106 and has the end 108 disposed within the generally rectangular groove 110 in the bottom side of a slide 112. The groove 110 opens generally outwardly at its entrant side such as to allow for the motion of the crank arm 102 as it rotates about the pin 104. Thus, as the crank arm 102 is moved about the pin 104, the rotational motion of the crank arm 102 is transferred into translational motion of the slide 112 and the slide assembly 114.

Figure 4:
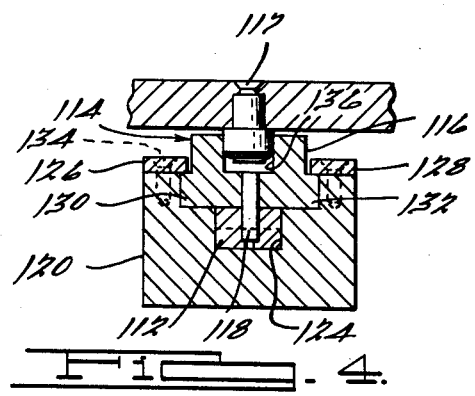
FIGURE 4 is a sectional view taken substantially along the line 4—4 in FIGURE 2.

The slide assembly 114 (FIGURE 3) has a channel member 116 secured to one end of the slide 112 by means of a plurality of dowel pins 118. The slide assembly 114 (FIGURE 4) is slidably retained within a groove 124 in a body 120 which is secured to the base member 34 by means of a plurality of dowel pins 122 and studs 123. The slide assembly 114 is secured from vertical movement out of the groove 124 in the body 120 by means of a pair of plates 126 and 128 which overlap extending portions 130 and 132 on either side of the channel member 116. The plates 126 and 128 are secured to the body 120 by means of a plurality of studs 134.

The motion of the slide assembly 114 is controlled by the instantaneous positional relationship between the cams 80 and 82 and the lever arm assembly 92. Thus, when the rise portion 81 on cam 80 contacts roller 98 on lever arm 94 the cam 82 has the depressed surface 83 in contact with roller 100 on offset lever arm 96; in this position the slide assembly 114 is in its radially innermost position relative to the center of the dial plate assembly 16. The slide assembly 114 maintains that position until the cam 82 contacts the roller 100 with a rise portion which moves the slide assembly 114 to its radially outermost position; at this time the roller 98 is no longer in contact with the rise portion 81 on cam 80. Thus, as the drive shaft 64 rotates, the slide assembly 114 is moved back and forth within the groove 124. Thus, cams 80 and 82 are located in the drive shaft 64 such as to provide this back and forth movement relative to the position of the drive rollers 70a and 70b.

A plurality of rollers 115a–115n are rotatably secured to the bottom side of the dial plate 17 by means of a plurality of pins 117. The number of rollers 115a–115n which correspond to the number of indexing slots 21a–21n in the geneva plate 19 are precisely located in equal angular and radial distances relative to the axis of rotation of the dial plate assembly 16.

The channel member 116 is provided with a groove 136 for receiving one of the plurality of rollers 115a–115n. The forward portion of the groove 136 is flared slightly outwardly such as to facilitate the engagement of the groove with the appropriate one of the rollers 115a–115n. As the slide assembly is moved to its radially inward position relative to the post 38, the groove 136 engages that one of the rollers 115a–115n then in that position. Any slight positional inaccuracy is corrected as the chamfered edge of the groove initially contacts that one of the rollers 115a–115n causing the dial plate assembly 16 to be rotated to its final position. Upon a further radially inward extension of the slide assembly 114, the dial plate assembly 16 is locked in this final position. Thus, a final and extremely accurate positioning is provided along with a locking action. Upon further rotation of the drive shaft 64 the slide assembly 114 is moved to its radially outermost position thereby disengaging it from the one of the rollers 115a–115n. The dial plate assembly is then ready to be rotated to its next position.

The complete sequence of operation occurs in the following manner:

Assuming now that the final positioning and locking means 24 is in the unlocked position, initial rotation of the drive spindle 64 rotates the drive plate 68 and hence one of the rollers 70a and 70b into engagement with one of the slots 21a–21n located on the geneva plate 19. The desired geneva motion is provided in a manner as previously described and the dial plate assembly 16 is indexed to a next position. Prior to the engagement of one of the rollers 70a and 70b with one of the slots 21a–21n, the unlocking cam 82 moves the lever arm assembly 92 such as to rotate the crank arm 102 about the pin 104 and holds the final positioning and locking means 24 in an unlocked position. This unlocking action is maintained during the geneva motion of the dial plate assembly 16. Upon completion of the geneva motion for that one indexing operation, the locking cam then starts to engage the cam roller 98 on the lever arm 94 with its rise portion 81. This causes initial engagement of the slide assembly 114 with one of the rollers 115a–115n and provides for the final positioning of the dial plate assembly 16. Upon further rotation of cam 80, the final locking of the dial plate assembly 16 is effectuated. Subsequently the slide assembly 114 is moved to its unlocked condition by engagement of the rise portion of cam 82 with roller 100. Note that depending upon the time required for the particular machining operations to be performed, the operation of the device as discussed above can be made continuous or there can be provided a sequencing mechanism operative in conjunction with the locking cam 80 and unlocking cam 82 such as to provide starting and stopping and hence rotation and non-rotation of the drive spindle 64.

The exactness of the positioning of the dial plate assembly 16 is dependent not upon the exactness of the machining of the plurality of slots or grooves 21a–21n in the geneva plate 19 but rather by the location of the plurality of rollers 115a–115n. One of the advantages in utilizing rollers 115a–115n is the comparative ease of accurate and precisional location of these rollers relative to the difficulty in similarly locating a plurality of slots. Also wear on the plurality of rollers is slight due to their ability to roll and hence reduce sliding friction. If excessive wear should occur to one or more of the rollers, it would be a relatively simple matter to replace the rollers whereas the sleeving or the building up of a plurality of slots could be an expensive or impossible task possibly necessitating the replacement of the geneva plate itself. Another advantage in the use of the plurality of rollers 115a–115n is in the fact that the dimensional accuracy can be more readily checked since the centers of the rollers allow an easily accessible reference point. Accuracy checks of a plurality of slots is more difficult due to the difficulty in consistently determining an adequate reference point.

The device discussed above is provided with positive locking and positive unlocking means. The advantages of this type of locking and unlocking means is that the locking and unlocking operation is insured to occur in sequence with a rotation of a single rotating member, in this case the drive spindle 64, and is not dependent upon some external driving member i.e. spring system, etc. Further, since all of the actuation is controlled and sequenced by a pair of cams 80, 82, there is no need to provide for a time delay for some external locking mechanism to provide the locking action.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. An indexing mechanism comprising a dial plate assembly rotatable about an axis, said dial plate assembly having a plurality of radially extending slots annularly disposed in equal angular intervals and a like plurality of rollers similarly annularly disposed in equal angular intervals, indexing means rotatable about a different axis and operatively associated with said slots for intermittently driving said dial plate assembly about said axis to a plurality of positions, each individual to one of said slots and said rollers, and positioning means operatively associated with said plurality of rollers for accurately positioning said dial plate assembly at each of said plurality of positions and for locking said dial plate assembly in each of said plurality of positions, said indexing means comprising a drive shaft rotatable about said different axis and a drive roller assembly fixed to said drive shaft for rotation about said different axis, said drive roller assembly having a drive roller supported at a point eccentric relative to said different axis and adapted to consecutively engage a different one of said plurality of slots upon each revolution about said different axis, said positioning means including a positioning and locking member movable between a first and a second position and being operatively associated with each of said plurality of rollers for accurately positioning said dial plate assembly at each of said plurality of positions during movement to said first position and for locking said dial plate assembly while in said first position and for unlocking said dial plate assembly when moved to said second position.

2. An indexing mechanism comprising a dial plate assembly rotatable about an axis, said dial plate assembly having a plurality of radially extending slots annularly disposed in equal angular intervals and a like plurality of rollers similarly annularly disposed in equal angular intervals, indexing means rotatable about a different axis and operatively associated with said plurality of slots for consecutively driving said dial plate assembly about said axis to a plurality of positions each individual to one of said plurality of rollers, slide means including a channel member movable in translation and consecutively engageable with that one of said plurality of rollers individual to that one of said plurality of positions for precisely positioning and then locking said dial plate assembly at each of said plurality of positions as said dial plate assembly is consecutively rotated to each of said plurality of positions by said indexing means, said indexing means comprising a drive shaft rotatable about said different axis and a drive roller assembly fixed to said drive shaft for rotation about said different axis, said drive roller assembly having a drive roller supported at a point eccentric relative to said different axis and adapted to consecutively engage a different one of said plurality of slots upon each revolution about said different axis, a cam assembly including a pair of cam members fixed to said indexing means for simultaneous rotation therewith about said different axis and operatively associated with said slide means for moving said channel member, a lever assembly supported for rotation about said axis and having a pair of rollers disposed on opposite sides of said different axis with each in engagement with a different one of said cam members whereby rotation of said cam assembly about said different axis causes pivoting of said lever assembly about said axis, lever means connected to said lever assembly and said slide means for moving said channel member in translation responsively to the pivoting movement of said lever assembly.

3. An indexing mechanism comprising a dial plate assembly rotatable about an axis, an indexing member operatively connected with the dial plate assembly and rotatable about a different axis for intermittently driving said dial plate assembly to a plurality of positions about said axis, a positioning and locking member movable between a first and a second position and being operatively associated with said dial plate assembly for accurately positioning said dial plate assembly at each of said plurality of positions during movement to said first position and for locking said dial plate assembly while in said first position and for unlocking said dial plate assembly when moved to said second position, a cam assembly fixed to said indexing member for rotation about said different axis and operatively connected with said positioning and locking member for driving and maintaining said positioning and locking member in said first and said second positions in accordance with a preselected time sequence, and a cam follower assembly supported for rotation about said axis and operatively connected with said cam assembly for pivotal movement about said axis responsively to rotation of said cam assembly about said different axis and operatively connected with said positioning and locking member for moving said positioning and locking member between said first and second position responsively to said pivotal movement.

4. An indexing mechanism comprising a dial plate assembly rotatable about an axis, said dial plate assembly including a dial plate having a plurality of rollers annularly disposed thereon in equal angular intervals and an index plate secured to said dial plate having a plurality of radially extending slots disposed in substantially equal angular intervals, indexing means rotatable about a different axis for driving said dial plate assembly about said axis to a plurality of positions each individual to one of said plurality of rollers, said indexing means including a drive roller eccentric with and rotatable about said different axis and adapted to consecutively engage a different one of said plurality of slots upon each revolution about said different axis, a positioning and locking member having a first and second position and being operatively associated with each of said plurality of rollers for accurately positioning said dial plate assembly at each of said plurality of positions during movement to said first position and for locking said dial plate assembly while in said first position and for unlocking said dial plate assembly when moved to said second position, and a cam assembly fixed to said indexing means for simultaneous rotation therewith about said different axis and operatively associated with said positioning and locking member for moving and maintaining said positioning and locking member in said first position over a preselected portion of said cam assembly and for moving and maintaining said positioning and locking member in said second position over a preselected different portion of said cam assembly with said drive roller engaging said slots for an interval during actuation of said positioning and locking member by said different portion of said cam assembly.

5. An indexing mechanism for indexing a plurality of workpieces to a plurality of consecutive work stations at which a different work operation is simultaneously performed on the plurality of workpieces comprising a dial plate assembly rotatable about an axis, said dial plate assembly including a dial plate for carrying the plurality of workpieces and having a plurality of rollers annularly disposed thereon in equal angular intervals and an index plate secured to said dial plate having a plurality of radially extending slots disposed in substantially equal angular intervals, indexing means rotatable about a different axis for driving said dial plate assembly about said axis to a plurality of positions each individual to one of said plurality of rollers, said indexing means including a drive roller eccentric with and rotatable about said different axis and adapted to consecutively engage a different one of said plurality of slots upon each revolution about said different axis, said dial plate carrying separate ones of the plurality of workpieces at locations individual with ones of said plurality of rollers, each of said plurality of positions having a different one of the plurality of work stations located thereat, a positioning and locking member having a first and second position and being operatively associated with each of said plurality of rollers for accurately positioning said dial plate assembly at each of said plurality of positions during movement to said first position and for locking said dial plate assembly while in said first position and for unlocking said dial plate assembly when moved to said second position, and a cam assembly fixed to said indexing means for simultaneous rotation therewith about said different axis and operatively associated with said positioning and locking member for moving and maintaining said positioning and locking member in said first position over a preselected portion of said cam assembly and for moving and maintaining said positioning and locking member in said second position over a preselected different portion of said cam assembly with said drive roller engaging said slots for an interval during actuation of said positioning and locking member by said different portion of said cam assembly.

References Cited in the file of this patent
UNITED STATES PATENTS

| | | |
|---|---|---|
| 741,467 | Donnelly | Oct. 13, 1903 |
| 1,481,983 | Brightman | Jan. 29, 1924 |
| 1,749,663 | Christiansen | Mar. 4, 1930 |
| 2,395,803 | Bruckner et al. | Mar. 5, 1946 |
| 2,588,977 | Gartner et al. | Mar. 11, 1952 |
| 2,868,032 | Miller | Jan. 13, 1959 |
| 2,915,921 | Scholin et al. | Dec. 8, 1959 |
| 2,986,949 | Lancaster et al. | June 6, 1961 |